(12) United States Patent
Myung et al.

(10) Patent No.: US 12,346,154 B2
(45) Date of Patent: Jul. 1, 2025

(54) SLIDABLE DISPLAY DEVICE

(71) Applicant: Samsung Display Co., LTD., Yongin-si (KR)

(72) Inventors: Man Sik Myung, Seoul (KR); Donghyeon Kim, Cheonan-si (KR); Ju Yeop Seong, Suwon-si (KR); Hee-Kwon Lee, Asan-si (KR); Jae-Soo Jang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 279 days.

(21) Appl. No.: 18/193,818

(22) Filed: Mar. 31, 2023

(65) Prior Publication Data

US 2023/0315146 A1 Oct. 5, 2023

(30) Foreign Application Priority Data

Apr. 1, 2022 (KR) .................. 10-2022-0041151

(51) Int. Cl.
*G06F 1/16* (2006.01)
(52) U.S. Cl.
CPC .......... *G06F 1/1624* (2013.01); *G06F 1/1616* (2013.01); *G06F 1/1652* (2013.01); *G06F 1/1656* (2013.01)
(58) Field of Classification Search
CPC combination set(s) only.
See application file for complete search history.

(56) References Cited

U.S. PATENT DOCUMENTS

| | | | |
|---|---|---|---|
| 9,891,725 B2 * | 2/2018 | Lindblad | G09F 9/301 |
| 10,019,036 B2 * | 7/2018 | Sun | G06F 1/1652 |
| 10,101,826 B2 * | 10/2018 | Lindblad | H10K 59/80 |
| 10,111,346 B2 * | 10/2018 | Seo | H05K 1/189 |
| 10,481,640 B2 * | 11/2019 | Kim | G06F 1/1652 |
| 10,809,552 B2 * | 10/2020 | Park | G02F 1/13 |
| 10,868,264 B2 | 12/2020 | Shin et al. | |
| 11,216,106 B2 * | 1/2022 | Lindblad | G06F 3/0416 |
| 11,940,849 B2 * | 3/2024 | Choi | G06F 1/1652 |
| 11,963,319 B2 * | 4/2024 | Min | H05K 5/0217 |
| 11,997,804 B2 * | 5/2024 | Kim | H05K 5/0017 |
| 12,053,971 B2 * | 8/2024 | Kim | B32B 5/18 |

(Continued)

FOREIGN PATENT DOCUMENTS

| | | |
|---|---|---|
| CN | 108572695 | 9/2018 |
| KR | 10-2016-0141255 | 12/2016 |

(Continued)

*Primary Examiner* — Lisa Lea-Edmonds
(74) *Attorney, Agent, or Firm* — KILE PARK REED & HOUTTEMAN PLLC

(57) ABSTRACT

A slidable display device includes: a display panel; and a support member supporting the display panel. The support member includes a first portion maintaining a form and a second portion adjacent to the first portion and being transformable, the second portion includes a plurality of bars, and each of the plurality of bars includes an edge side including a first side, a second side connected to the first side and being inclined from the first side, a third side including two sides forming a step, a fourth side connecting between the two sides of the third side, a fifth side including two sides facing the third side and forming a step, and a sixth side connecting between the two sides of the fifth side.

20 Claims, 24 Drawing Sheets

(56) References Cited

U.S. PATENT DOCUMENTS

| | | | | |
|---|---|---|---|---|
| 2017/0285688 A1* | 10/2017 | Sun | ...................... | G06F 1/1681 |
| 2019/0174640 A1* | 6/2019 | Park | ...................... | H05K 5/0217 |
| 2022/0264754 A1* | 8/2022 | Kim | ...................... | G06F 1/1652 |
| 2022/0394868 A1* | 12/2022 | Min | ...................... | G06F 1/1637 |
| 2023/0315146 A1* | 10/2023 | Myung | ................ | G06F 1/1656 |
| | | | | 361/679.01 |
| 2024/0231441 A1* | 7/2024 | Choi | ...................... | G06F 1/1652 |
| 2024/0237243 A1* | 7/2024 | Min | ...................... | G06F 1/1637 |

FOREIGN PATENT DOCUMENTS

| | | |
|---|---|---|
| KR | 10-2020-0084980 | 7/2020 |
| KR | 10-2021-0031348 | 3/2021 |
| KR | 10-2262991 | 6/2021 |
| KR | 10-2021-0154719 | 12/2021 |

\* cited by examiner

SLIDABLE DISPLAY DEVICE

CROSS-REFERENCE TO RELATED APPLICATION(S)

This application claims priority to and benefits of Korean Patent Application No. 10-2022-0041151 under 35 U.S.C. § 119, filed on Apr. 1, 2022, in the Korean Intellectual Property Office (KIPO), the entire contents of which are incorporated herein by reference.

BACKGROUND

1. Technical Field

Embodiments relate to a slidable display device.

2. Description of the Related Art

Together with recent development of display-related technology, deformable (or flexible) display devices, which are foldable, rollable in a roll shape, and stretchable like a rubber band, or have a display screen expandable in a sliding method, have been researched and developed. As the flexible display devices are modifiable in various shapes, a request of enlarging the display screen and a request for down-sizing the display screen may be satisfied.

Among the flexible display devices, slidable display devices may expand or reduce the display screen in a sliding method. The slidable display device may include a display panel for displaying images and a support structure for supporting the display panel. The slidable display device may be transformed between the folded display panel state and the unfolded display panel state according to a slide-out state or a slide-in state. The display screen of the slidable display device may be exposed to the outside in case that the display panel is bent like the out-foldable display device.

The above information disclosed in this Background section is only for enhancement of understanding of the background of the invention, and therefore it may contain information that does not form the prior art that is already known in this country to a person of ordinary skill in the art.

SUMMARY

Embodiments provide a slidable display device capable of preventing defects of distortion, scratching, and cracks in a sliding operation, and defects caused by external impacts.

In an embodiment, a slidable display device may include: a display panel; and a support member supporting the display panel, wherein the support member includes a first portion maintaining a form and a second portion adjacent to the first portion and transformable, the second portion of the support member may include a plurality of bars, and each of the plurality of bars may include an edge side including a first side, a second side connected to the first side and being inclined from the first side, a third side including two sides forming a step, a fourth side connecting between the two sides of the third side, a fifth side including two sides facing the third side and forming a step, and a sixth side connecting between the two sides of the fifth side.

The first side of each bar may face the display panel.

The plurality of bars may include a first bar and a second bar that are adjacent to each other and engaged to each other, and the third side and the fourth side of the first bar may face the fifth side and the sixth side of the second bar.

The third side and the fourth side may be alternately disposed in a linear shape or a curved shape, and the fifth side and the sixth side may be alternately disposed in a linear shape or a curved shape.

The third side and the fourth side may form a concave shape, and the fifth side and the sixth side may form a convex shape.

The slidable display device may include a curved portion of which a position is changeable according to a sliding operation, and a first non-curved portion connected to the curved portion, and the first non-curved portion may include the first portion of the support member.

The curved portion may include the second portion of the support member.

In case that a slide-out operation is performed, a position of the curved portion may be moved and the first non-curved portion may extend.

The slidable display device may further include a second non-curved portion connected to the curved portion in case that a slide-in operation is performed, wherein the second non-curved portion may face the first non-curved portion, and the second non-curved portion may include the first portion of the support member.

A gap between neighboring bars disposed on the curved portion may be substantially equal to a gap between neighboring bars disposed on the first non-curved portion.

The plurality of bars may include: a first bar and a second bar adjacent to each other and disposed on the curved portion and a third bar and a fourth bar adjacent to each other and disposed the first non-curved portion, and a distance between the first side of the first bar and the first side of the second bar may be substantially equal to a distance between the first side of the third bar and the first side of the fourth bar.

The slidable display device may further include a support plate disposed between the display panel and the support member, wherein the support plate may include a planar plate portion overlapping the first portion of the support member and a flexible portion overlapping to the second portion of the support member.

The flexible portion of the support plate may include a plurality of pattern portions from which at least part of the support plate is removed.

The first side may not overlap the plurality of pattern portions, and the second side may overlap the plurality of pattern portions.

The slidable display device may further include a pair of guide portions disposed on a lateral side on which respective end portions of the bars are disposed, wherein the guide portion may include a guide rail that guide movement of the bars.

The plurality of bars may further include a combining portion disposed on respective end portions, and the combining portion may include a first fixing portion and a second fixing portion disposed on respective sides of the guide rail.

In an embodiment, a slidable display device may include: a display panel; and a support member supporting the display panel, wherein the support member may include a first portion maintaining a form and a second portion adjacent to the first portion and transformable, the second portion may include a plurality of bars, the display panel and the support member may include a curved portion of which a position is changeable according to a sliding operation and a first non-curved portion connected to the curved portion, the first non-curved portion may include the first portion of the support member, and a gap between neighboring bars of the plurality of bars disposed on the curved portion may be substantially equal to a gap between neighboring bars of the plurality of bars disposed on the first non-curved portion.

The curved portion may include the second portion of the support member, and the position of the curved portion may be moved and the first non-curved portion may extend in case that a slide-out operation is performed.

Each of the plurality of bars may respectively include a first side facing the display panel, the plurality of bars may include: a first bar and a second bar adjacent to each other and disposed on the curved portion, and a third bar and a fourth bar adjacent to each other and disposed the first non-curved portion, and a distance between the first side of the first bar and the first side of the second bar may be substantially equal to a distance between the first side of the third bar and the first side of the fourth bar.

In an embodiment, a slidable display device may include: a display panel; a support member supporting the display panel; and a support plate disposed between the display panel and the support member, wherein the support member may include a first portion maintaining a shape and a second portion disposed near the first portion and being transformable, the second portion may include a plurality of bars, the display panel and the support member may include a curved portion of which a position is changeable according to a sliding operation, and a first non-curved portion connected to the curved portion, each of the plurality of bars may include an edge side including a first side contacting a support plate, and a second side bent on the first side, wherein the second side of the bar disposed on the first non-curved portion may be spaced from the support plate by a first gap, and the second side of the bar disposed on the curved portion may be spaced from the support plate by a second gap that is less than the first gap or contacts the support plate.

According to the embodiments, defects of distortion, scratching, and cracks in a slidable display device, and defects caused by external impacts, may be prevented.

DETAILED DESCRIPTION OF THE EMBODIMENTS

Figure 1:
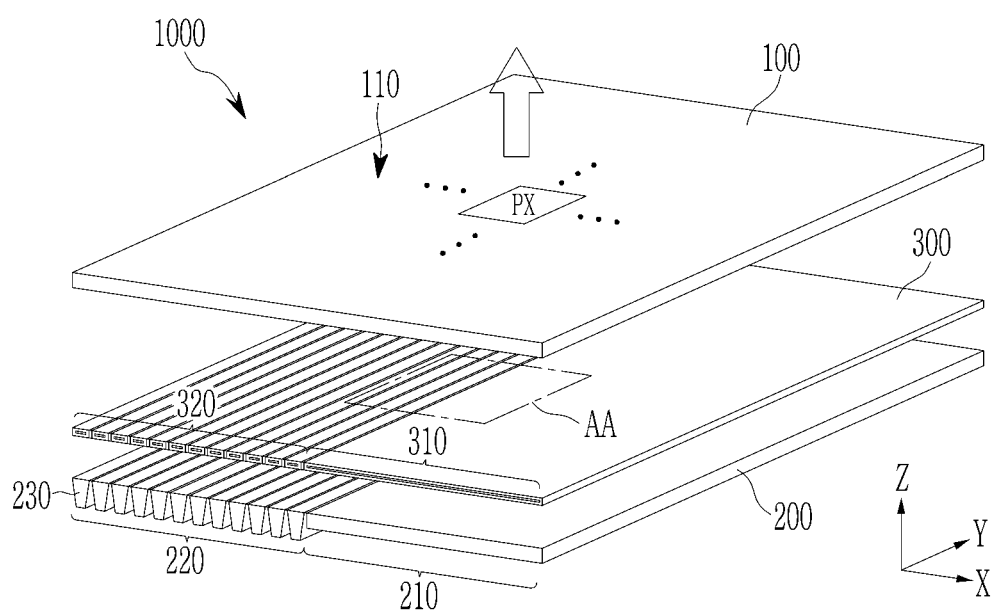
FIG. 1 shows a schematic exploded perspective view of a display device according to an embodiment.

The invention will be described more fully hereinafter with reference to the accompanying drawings, in which embodiments of the invention are shown. As those skilled in the art would realize, the described embodiments may be modified in various different ways, all without departing from the spirit or scope of the disclosure.

Parts that are irrelevant to the description will be omitted to clearly describe the invention, and the same elements will be designated by the same reference numerals throughout the specification.

Parts that are irrelevant to the description are omitted to clearly describe the disclosure, and like reference numerals designate like elements throughout the specification. In the drawings, the thickness of layers, films, panels, regions, etc., are enlarged for clarity. The thicknesses of some layers and areas are exaggerated.

It will be understood that in case that an element such as a layer, film, region, or substrate is referred to as being "on" another element, it can be directly on the other element or intervening elements may also be present. In contrast, in case that an element is referred to as being "directly on" another element, there are no intervening elements present. The word "on" or "above" means disposed on or below the object portion, and does not necessarily mean disposed on the upper side of the object portion based on a gravitational direction.

Unless explicitly described to the contrary, the word "comprise", and variations such as "comprises" or "comprising", will be understood to imply the inclusion of stated elements but not the exclusion of any other elements.

The phrase "in a plan view" means viewing a target portion from the top, and the phrase "in a cross-sectional view" means viewing a cross-section formed by vertically cutting a target portion from the side.

A display device 1000 according to an embodiment will now be described with reference to FIG. 1 to FIG. 4.

Figure 2:
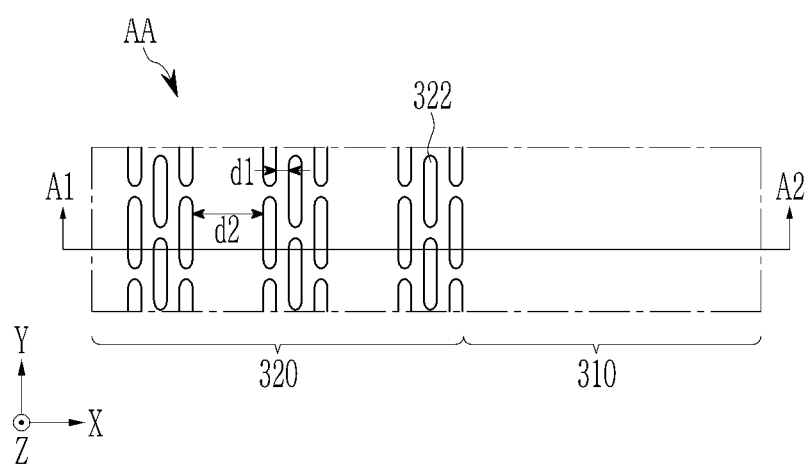
FIG. 2 shows a schematic top plan view of a part AA of a display device shown in FIG. 1.
Figure 3:
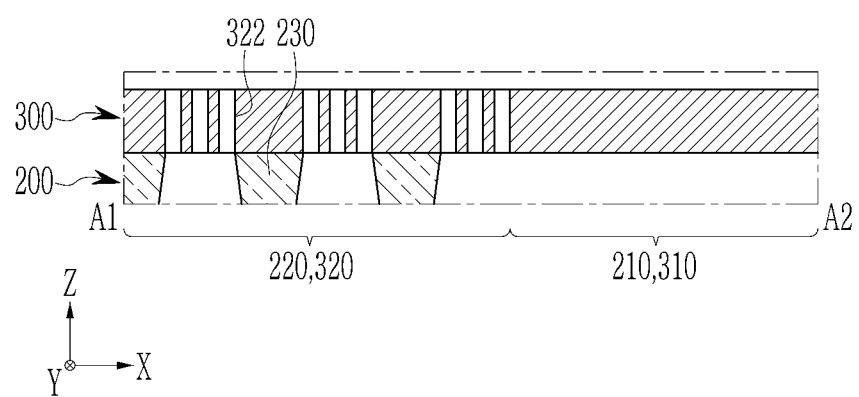
FIG. 3 shows a schematic cross-sectional view taken along line A1-A2 of FIG. 2.
Figure 4:
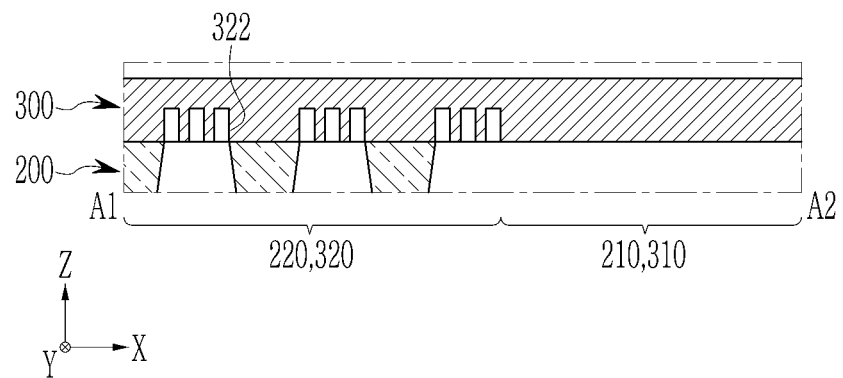
FIG. 4 shows another example of a schematic cross-sectional view taken along line A1-A2 of FIG. 2.

FIG. 1 shows a schematic exploded perspective view of a display device 1000 according to an embodiment, FIG. 2 shows a schematic top plan view of a part AA of a display device 1000 shown in FIG. 1, FIG. 3 shows a schematic cross-sectional view taken along line A1-A2 of FIG. 2, and FIG. 4 shows another example of a schematic cross-sectional view taken along line A1-A2 of FIG. 2.

Referring to FIG. 1, the display device 1000 may include a display panel 100, and a support structure (e.g., a support member) 200 overlapping the display panel 100. The display device 1000 is a slidable display device, and FIG. 1 shows a schematic exploded perspective view of an unfolded display device.

The display panel 100 may include a substrate on which pixels PX for displaying images on an XY plane are formed. The display panel 100 may have an opposite side to the side on which the support structure 200 is positioned, e.g., a display side 110, for displaying images in an X direction in FIG. 1. The respective pixels PX may include at least one transistor and at least one light-emitting device. The display panel 100 may be flexible.

The support structure 200 may partially or entirely overlap the display panel 100 in a Z direction and may support the display panel 100. The support structure 200 may include a first portion 210 maintaining (or having) a fixed form, and a second portion 220 that is adjacent to a side of the first portion 210 and may be transformed.

The first portion 210 may maintain a substantially fixed (or constant) planar form, and may extend to the XY plane where the display panel 100 extends. A portion of the display panel 100 that corresponds to (or overlaps) the first portion 210 may be fixed (or maintained) to be a planar form.

The second portion 220 may be transformed to be curved or unfolded in the X direction that is a neighboring direction of the first portion 210. The second portion 220 may include bars (or multi-bars) 230 extending in a Y direction that is perpendicular to the X direction. For example, the Y direction may be an axis of bending or an axis of curving. The bars 230 may be arranged in the X direction (e.g., in the slide direction).

At least one support plate 300 may be positioned between the display panel 100 and the support structure 200. The support plate 300 may have a thin plate shape. The support plate 300 may partially or entirely overlap the display panel 100 in the Z direction and may connect the display panel 100 and the support structure 200. The support plate 300 may buffer and protect between the support structure 200 and the display panel 100.

Referring to FIG. 1 and FIG. 2, the support plate 300 may include a planar plate portion 310 corresponding to (or overlapping) the first portion 210 of the support structure 200, and a flexible portion 320 corresponding to (or overlapping) the second portion 220 of the support structure 200. The flexible portion 320 may be connected to a side of the planar plate portion 310 and may be integral with the planar plate portion 310. For example, the planar plate portion 310 and the flexible portion 320 may be made of a same material such as stainless steel (SUS). The flexible portion 320 may be flexible and may have an elastic restoring force. The planar plate portion 310 may be flexible, and the flexible portion 320 may be more flexible than the planar plate portion 310.

FIG. 2 shows a schematic enlarged view of the part AA of FIG. 1. Referring to FIG. 2, the planar plate portion 310 of the support plate 300 may have a continuous planar shape without pattern portions (e.g., holes or concave portions) on the XY plane, and pattern portions (e.g., holes or concave portions) 322 may be generated on the flexible portion 320 of the support plate 300 so the flexible portion 320 may have flexibility.

Referring to FIG. 2 and FIG. 3, the pattern portions 322 included by the flexible portion 320 of the support plate 300 may include holes penetrating in the Z direction that is a thickness direction of the support plate 300. Regarding the schematic cross-sectional view of FIG. 3, the respective bars 230 of the support structure 200 may not overlap the pattern portions 322 of the flexible portion 320 in the Z direction, and differing from this, the respective bars 230 may overlap the pattern portions 322 of the flexible portion 320 in the Z direction.

Referring to FIG. 2, in the XY plane view, the respective pattern portions 322 may extend in a direction (e.g., Y direction), but embodiments are not limited thereto. The pattern portions 322 may be arranged or classified in groups arranged in the X direction, the pattern portions 322 of the groups may closely neighbor each other, and the groups neighboring in the X direction may be spaced in the X direction with a distance d2 that is greater than a distance d1 among the neighboring pattern portions 322 in the respective groups. Referring to FIG. 3, a distance between the groups formed by pattern portions 322 in the X direction may be substantially equal to a distance between the bars 230 of the support structure 200 in the X direction.

Referring to FIG. 2 and FIG. 4, pattern portions 322 included by the flexible portion 320 of the support plate 300 may form holes (or recess portions) which do not penetrate in the Z direction that is a thickness direction of the support plate 300 but from which parts of the support plate 300 in the thickness direction are removed. As shown in FIG. 4, the holes (or concave portions) of the pattern portions 322 may be formed on a side where the support structure 200 is positioned from among sides of the support plate 300. In another example, the holes of the pattern portions 322 may be formed on an opposite side of the support structure 200 from among sides of the support plate 300. Other characteristics may correspond to what are described in the above.

The flexible portion 320 of the support plate 300 may include pattern portions 322 on a portion that corresponds to the second portion 220 of the support structure 200 and may thus ease transformation, such as bending, of the second portion 220.

A slide-in and slide-out state and operation of a slidable display device will now be described with reference to FIG. 5 and FIG. 6 together with FIG. 1 to FIG. 4.

Figure 5:
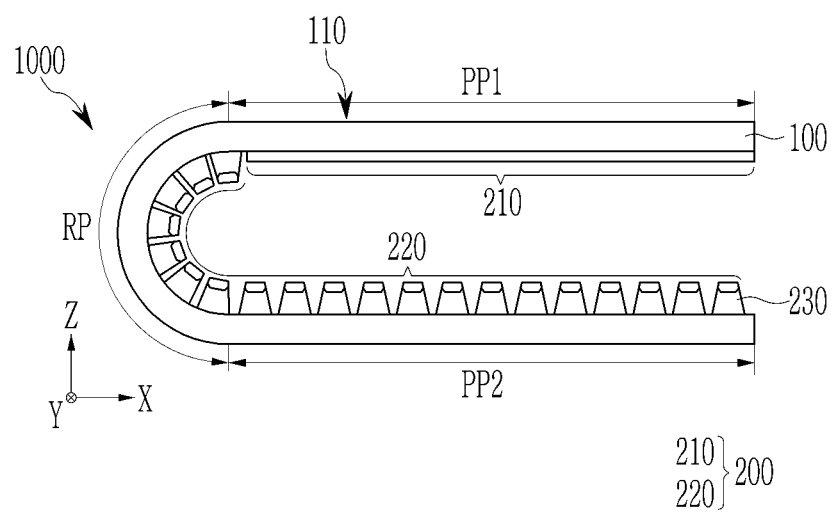
FIG. 5 shows a schematic cross-sectional view in case that a display panel according to an embodiment is folded.
Figure 6:
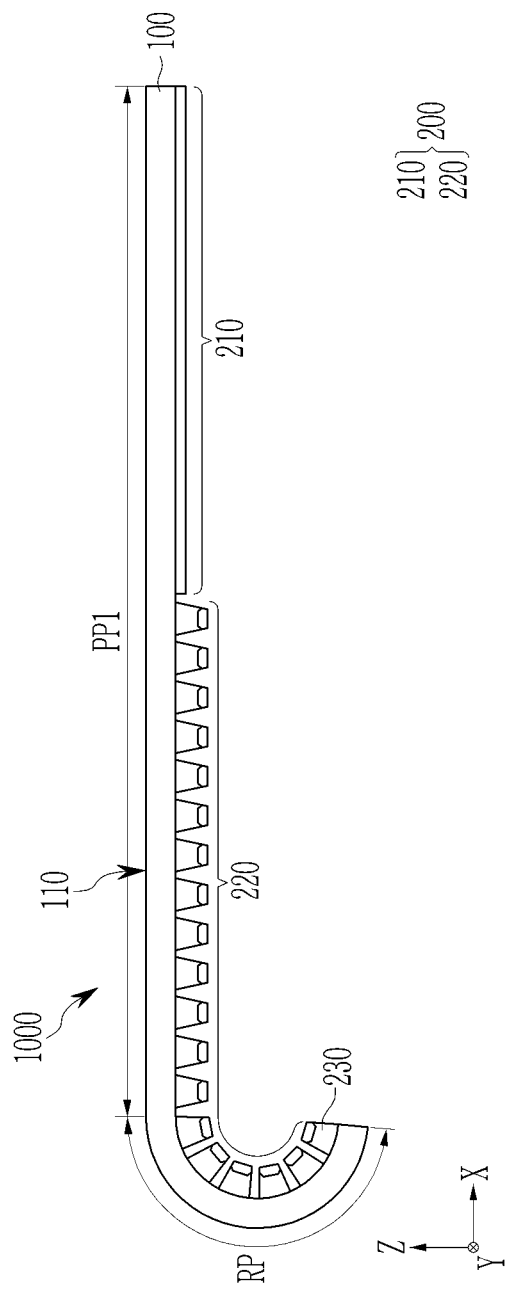
FIG. 6 shows a schematic cross-sectional view in case that a display panel according to an embodiment is unfolded.

FIG. 5 shows a schematic cross-sectional view in case that a display panel according to an embodiment is folded (e.g., a folded state), and FIG. 6 shows a schematic cross-sectional view in case that a display panel according to an embodiment is unfolded (e.g., an unfolded state).

Referring to FIG. 5 and FIG. 6, the display device 1000 according to an embodiment is a slidable display device, and it may expand or reduce the display side 110 for displaying images in a direction (e.g., Z direction) in a sliding method.

The display side 110 may extend in an XY plane that is perpendicular to the Z direction.

FIG. 5 shows that the display device 1000 is in a slide-in state and the display panel 100 is folded. FIG. 6 shows that the display device 1000 is in a slide-out state and the display panel 100 is unfolded. The display device 1000 may be transformed between the state (e.g., a folded state or a slide-in state) that the display panel 100 is folded as shown in FIG. 5 and the state (e.g., an unfolded state or a slide-out state) that the display panel 100 is unfolded as shown in FIG. 6. The display panel 100 may be slidable in the X direction (e.g., a slide direction).

Referring to FIG. 5, the display device 1000 in a slide-in state may include a curved portion RP and first and second non-curved portions (e.g., first and second flat portions) PP1 and PP2 connected to respective end portions of the curved portion RP with the curved portion RP therebetween. The curved portion RP may have a radius that is constant or variable with respect to position and may have a curved shape. The first and second non-curved portions PP1 and PP2 may be substantially planar. The first and second non-curved portions PP1 and PP2 may face each other in the Z direction that is perpendicular to the XY plane on which the non-curved portions PP1 and PP2 extend.

Regarding the display device 1000 in a slide-in state, the display side 110 may be exposed to the outside and may display images in case that the display panel 100 is folded in a like way of the out-foldable display device. FIG. 5 shows that the display side 110 is positioned on the first non-curved portion PP1, but embodiments are not limited thereto. For example, the curved portion RP may include a display side for displaying images to the outside, and the second non-curved portion PP2 may include a display side for displaying images to a lower side. For example, the display side 110 for displaying images may be positioned on at least one of the curved portion RP and the second non-curved portion PP2 in addition to the first non-curved portion PP1.

Regarding the display device 1000 in a slide-in state, the first non-curved portion PP1 may include a first portion 210 of the support structure 200, and the curved portion RP and the second non-curved portion PP2 may include a second portion 220 of the support structure 200. For example, in the slide-in state, the second portion 220 of the support structure 200 may include a curved portion RP and a second non-curved portion PP2.

Referring to FIG. 5 and FIG. 6, in case that the slide-in state is changed to the slide-out state, the position of the curved portion RP moves on the second portion 220 of the support structure 200. For example, a portion that is the curved portion RP in FIG. 5 is unfolded to be parallel to the first non-curved portion PP1, the position of the curved portion RP gradually moves toward an end portion of the second non-curved portion PP2, and the display device 1000 is unfolded in a sliding method. Accordingly, a portion that is the curved portion RP is changed to the first non-curved portion PP1, the first non-curved portion PP1 extends, and the display side 110 on the first non-curved portion PP1 extends. As shown in FIG. 6, the curved portion RP may be formed at an end portion of the display panel 100, and differing from this, the display panel 100 may be completely unfolded to the end and the curved portion RP may disappear.

A form and a length of the curved portion RP may be determined by forms and widths of bars 230 of the second portion 220 of the support structure 200.

A support structure 200 and a guide portion 400 of a display device 1000 according to an embodiment will now be described with reference to FIG. 7 to FIG. 11 together with the above-described drawings.

Figure 7:
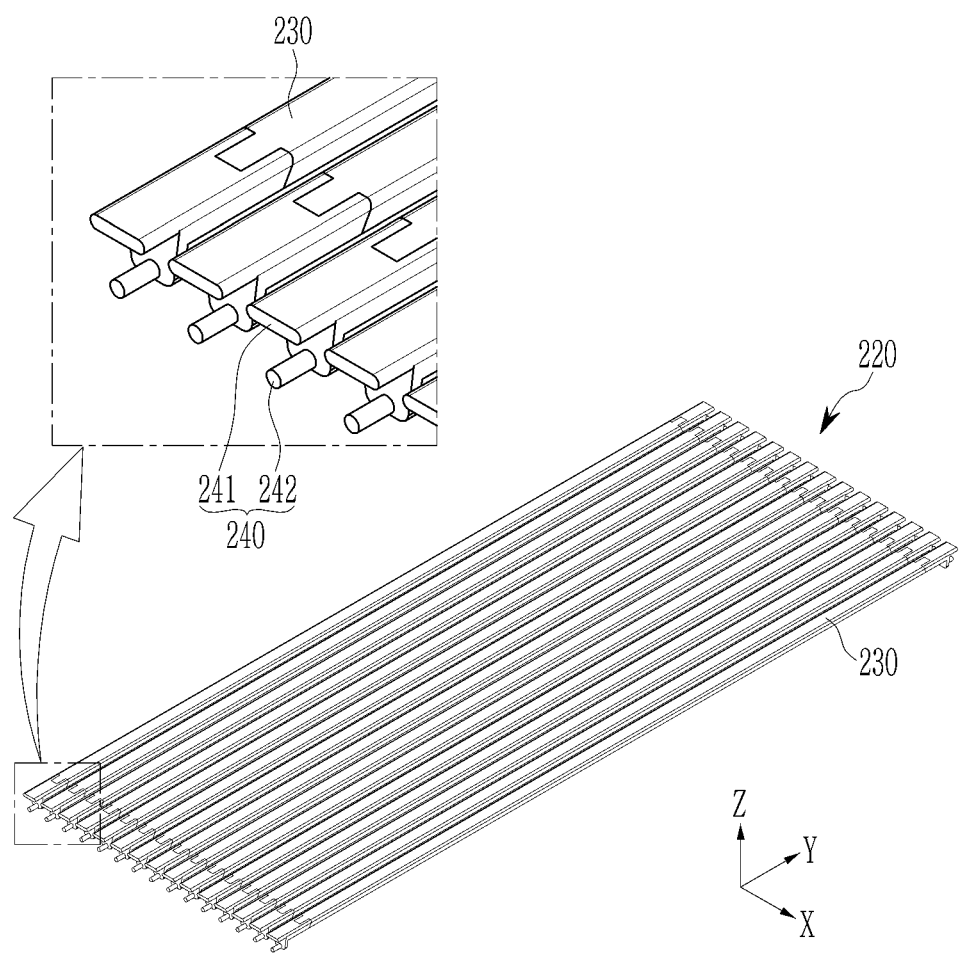
FIG. 7 shows a schematic perspective view of an enlarged part of a support structure of a display device according to an embodiment.
Figure 8:
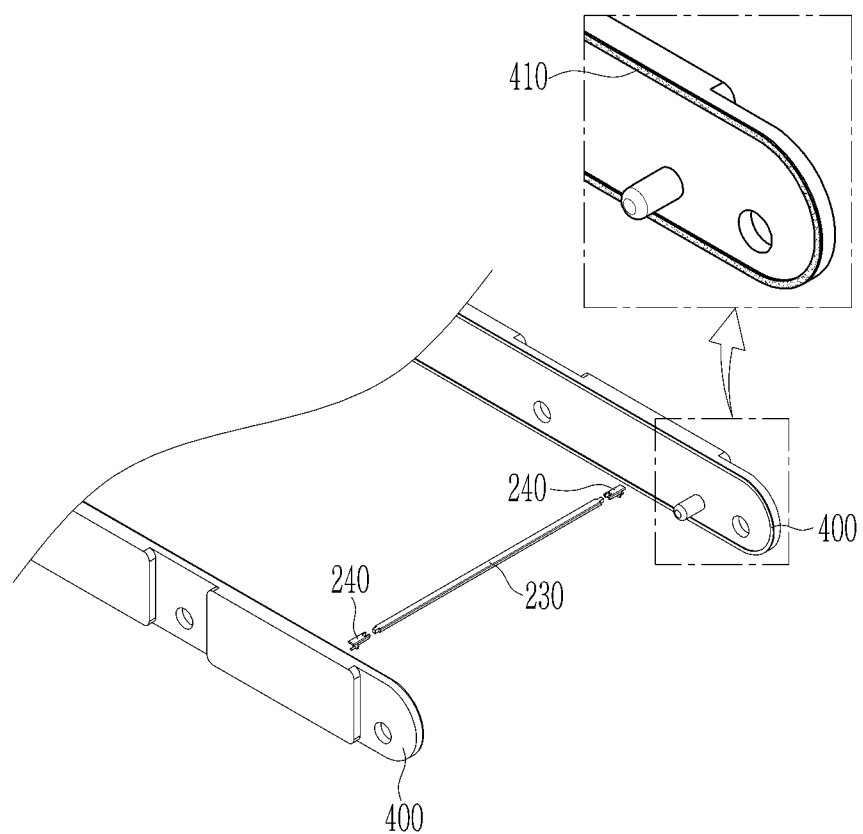
FIG. 8 shows a schematic perspective view of a part of a guide portion of a display device according to an embodiment.
Figure 9:
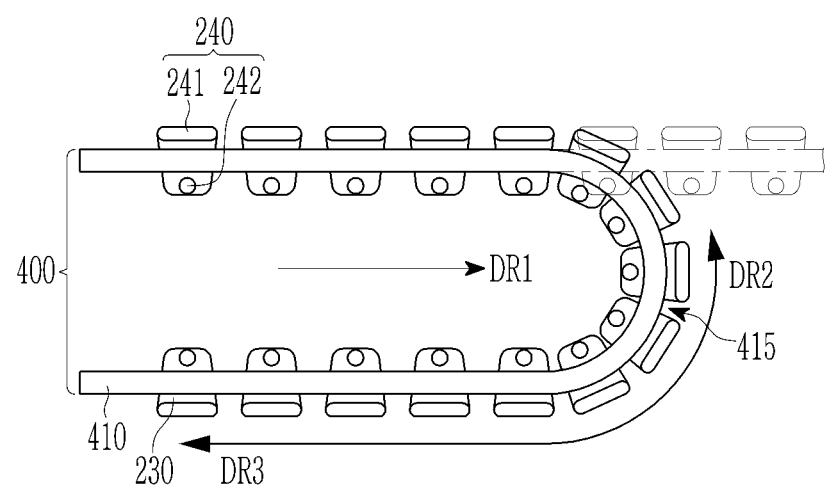
FIG. 9 shows a schematic side view of a guide portion of a support structure of a display device according to an embodiment.
Figure 10:
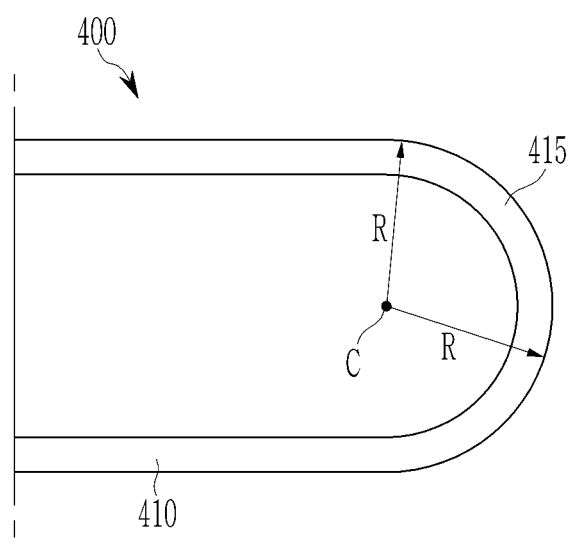
FIG. 10 shows a side view of a guide portion of a display device according to an embodiment.
Figure 11:
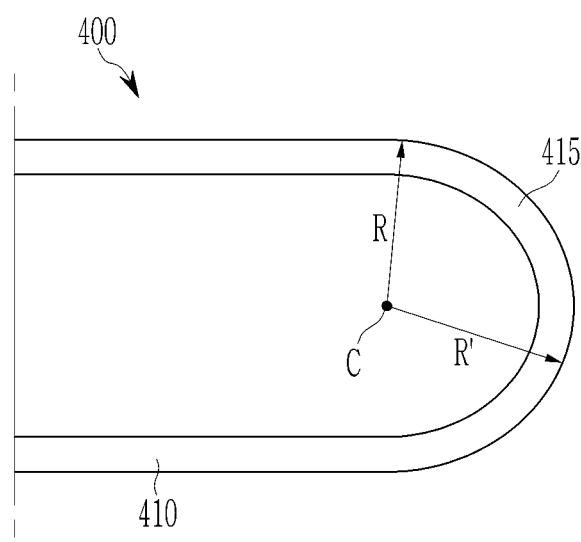
FIG. 11 shows another example of a schematic side view of a guide portion of a display device according to an embodiment.

FIG. 7 shows a schematic perspective view of an enlarged part of a support structure 200 of a display device 1000 according to an embodiment, FIG. 8 shows a schematic perspective view of a part of a guide portion 400 of a display device 1000 according to an embodiment, FIG. 9 shows a schematic side view of a guide portion 400 of a support structure 200 of a display device 1000 according to an embodiment, FIG. 10 shows a schematic side view of a guide portion 400 of a display device according to an embodiment, and FIG. 11 shows another example of a schematic side view of a guide portion 400 of a display device 1000 according to an embodiment.

Referring to FIG. 1, FIG. 7, and FIG. 8, bars 230 of the second portion 220 of the support structure 200 may include combining portions 240 positioned at respective end portions. The combining portions 240 may have various shapes, and for example, as shown in FIG. 7. For example, the combining portions 240 may include a first fixing portion 241 and a second fixing portion 242 protruding in the direction in which the bars 230 extend.

The display device 1000 according to an embodiment may include a pair of guide portions 400 positioned on a lateral side on which respective end portions of bars 230 are positioned. Bars 230 may be positioned between a pair of guide portions 400. Referring to FIG. 8 and FIG. 9, the respective guide portions 400 may include a guide rail 410 positioned on sides facing each other. The guide rail 410 may extend along an edge portion of the guide portion 400 and may protrude toward bars 230.

As shown in FIG. 9, the first fixing portion 241 and the second fixing portion 242 of the combining portion 240 positioned on respective end portions of bars 230 may be positioned on respective sides of the guide rail 410 so movement of the bar 230 may be guided by the guide rail 410. During a slide-out operation of the display device 1000, the guide portion 400 move in the direction in which the display device 1000 is unfolded in the first direction DR1, and bars 230 may move in the second direction DR2 along the guide rail 410 and may be transformed in an unfolded state. For example, during a slide-in operation of the display device 1000, the guide portion 400 move in the direction in which the display panel is folded in an opposite direction to the first direction DR1, and the bars 230 may move in the third direction DR3 along the guide rail 410 and may be transformed in a folded state.

Referring to FIG. 10 and FIG. 11, the guide rail 410 viewed from a lateral side may correspond to a lateral shape of the folded display panel 100 or a lateral shape of the support structure 200, as shown in FIG. 5. A curved portion 415 at an end portion of the guide rail 410 may have the same shape as the above-described curved portion RP, and the curved portion 415 of the guide rail 410 may have a radius R that is less than a radius of the curved portion RP of the display panel 100. Referring to FIG. 10 and FIG. 11, the radii R and R' may be measured from a center C.

In case that the above-noted curved portion RP has a constant radius, the curved portion 415 of the guide rail 410 may have a constant radius R, as shown in FIG. 10. However, as shown in FIG. 11, the curved portion 415 of the guide rail 410 may have other radii R and R' according to the positions. For example, the radius of the above-described curved portion RP may be changed. A cross-sectional shape of the curved portion 415 of the guide rail 410 with a constant radius R may be circular. However, embodiments are not limited thereto, the cross-sectional shape of the curved portion 415 of the guide rail 410 may be oval. In case that the curved portion 415 of the guide rail 410 is oval, the guide portion 400 may be an oval that is long in a horizontal direction to improve the movement of bars 230.

A shape of bars included by a display device 1000 according to an embodiment will now be described with reference to FIG. 12 to FIG. 18 together with the above-described drawings.

Figure 12:
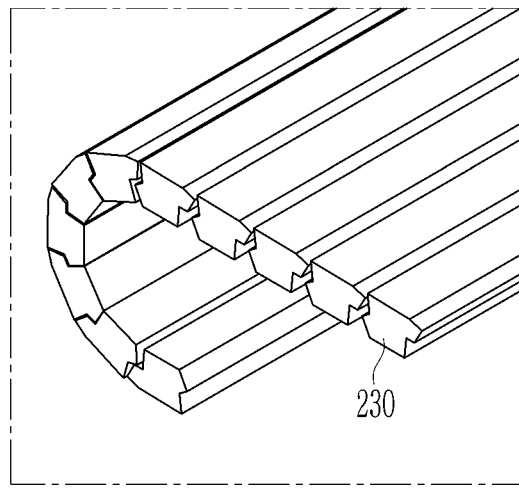
FIG. 12 shows a schematic perspective view of a part of a support structure of a display device according to an embodiment.
Figure 13:
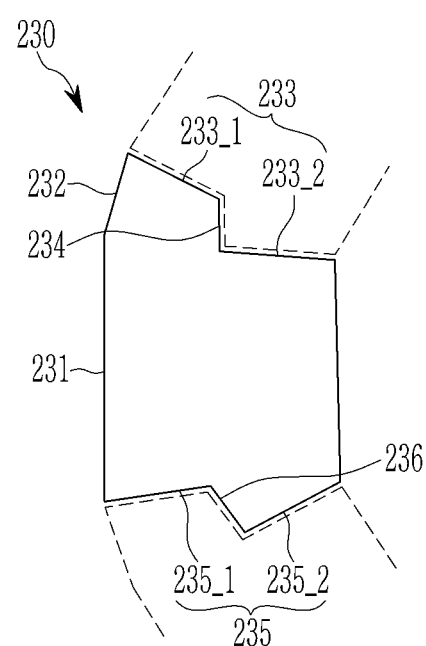
FIG. 13 shows a schematic cross-sectional view of a bar of a support structure of a display device according to an embodiment.
Figure 14:
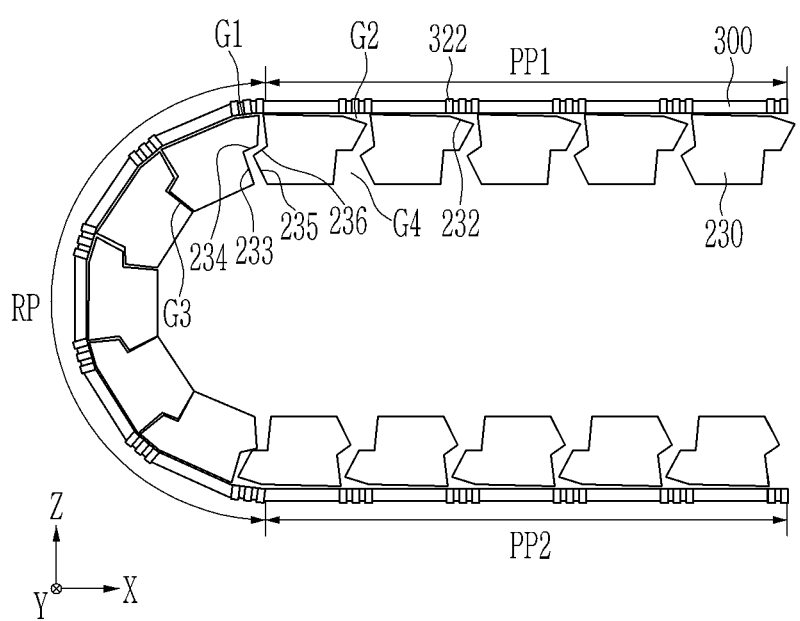
FIG. 14 shows a schematic cross-sectional view of a support structure of a display device according to an embodiment.
Figure 15:
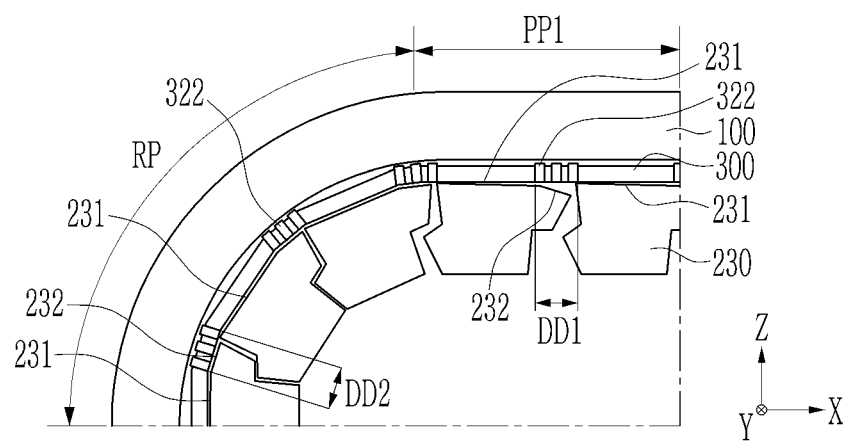
FIG. 15 shows a schematic cross-sectional view of a part of a display device according to an embodiment.

FIG. 12 shows a schematic perspective view of part of a support structure 200 of a display device 1000 according to an embodiment, FIG. 13 shows a schematic cross-sectional view of a bar of a support structure 200 of a display device 1000 according to an embodiment, FIG. 14 shows a schematic cross-sectional view of a support structure 200 of a display device 1000 according to an embodiment, and FIG. 15 shows a schematic cross-sectional view of a part of a display device 1000 according to an embodiment.

Referring to FIG. 12 and FIG. 13, the cross-sectional shape of the bar 230 included by the support structure 200 of the display device 1000 according to an embodiment may be a polygon or a polygon having at least one round corner. The cross-sectional shape of the bar 230 may have at least one protruding structure.

For example, an external edge side of the bar 230 may include a first side 231, a second side 232, a third side 233 including two sides (e.g., a third-first side 233_1 and a third-second side 233_2) forming a step and spaced apart from each other, a fourth side 234 connecting between the two sides of the third side 233, a fifth side 235 including two sides (e.g., a fifth-first side 235_1 and a fifth-second side 235_2) facing the third side 233, forming a step in a like way of the third side 233, and spaced apart from each other, and a sixth side 236 connecting between the two sides of the fifth side 235. For example, the second side 232 may be connected to the first side 231, may not be in parallel with the first side 231, and may be inclined from the first side 231. The first to sixth sides 231 to 236 shown in FIG. 13 may extend in the direction in which the bar 230 extends.

The first side 231 may be a side facing the above-described support plate 300 or the display panel 100 and the first side 231 may contact the support plate 300 or the display panel 100. Referring to FIG. 14, the first side 231 may not overlap the pattern portions 322 of the support plate 300.

The second side 232 may be bent from the first side 231 and may be smaller than the first side 231. As shown in FIG. 14, the second side 232 may overlap a region in which the pattern portions 322 of the support plate 300 is positioned. The second side 232 of the bar 230 positioned on the first and second non-curved portions PP1 and PP2 of the display device 1000 may be spaced from the support plate 300, and the second side 232 of the bar 230 positioned on the curved portion RP may contact the support plate 300 or may be disposed nearer the support plate 300 than the second side 232 of the bar 230 of the first and second non-curved portions PP1 and PP2.

The third side 233 may be connected to the second side 232 and may be bent from the second side 232. The fifth side 235 may be connected to the first side 231 and may be bent from the first side 231. The third side 233 and the fourth side 234 connected to each other may form a linear alternate shape (e.g., a first linear zigzag shape). The third side 233 and the fourth side 234 may be alternately disposed in a linear shape. For example, the fifth side 235 and the sixth side 236 connected to each other may form a linear alternate shape (e.g., a second linear zigzag shape different from the first linear zigzag shape). The fifth side 235 and the sixth side 236 may be alternately disposed in a linear shape. The structure of the third side 233 and the fourth side 234 or the structure of the fifth side 235 and the sixth side 236 is referred to as a protruding structure.

Referring to FIG. 13 and FIG. 14, the third side 233 and the fourth side 234 of a bar 230 may be engaged to (or adjacent to) the fifth side 235 and the sixth side 236 of the neighboring bar 230 to thus support each other and prevent distortion between the neighboring bars 230. For example, one (e.g., the third-first side 233_1) of the two sides forming the step of the third side 233 of the bar 230 may face one (e.g., the fifth-first side 235_1) of the two sides forming the step of the fifth side 235 of the neighboring bar 230. For example, another one (e.g., the third-second side 233_2) of the two sides forming the step of the third side 233 of the bar 230 may face another one (e.g., the fifth-second side 235_2) of the two sides forming the step of the fifth side 235 of the neighboring bar 230. For example, the fourth side 234 of the bar 230 may face the sixth side 236 of the neighboring bar 230.

Referring to FIG. 14, the third side 233 and the fourth side 234 of the bar 230 positioned on the first and second non-curved portions PP1 and PP2 of the display device 1000 may face the facing fifth side 235 and the sixth side 236 of the neighboring bar 230 and may be spaced from each other. However, the third side 233 and the fourth side 234 of the bar 230 positioned on the curved portion RP of the display device 1000 may contact the fifth side 235 and the sixth side 236 of the neighboring bar 230 positioned on the curved portion RP. For example, the second side 232 of the bar 230 disposed on the curved portion RP may contact the bottom surface of the support plate 300 disposed on the curved portion RP. For example, a first gap G1 between the second side 232 of the bar 230 disposed on the curved portion RP and the bottom surface of the support plate 300 disposed on the curved portion RP may be less than a second gap G2 between the second side 232 of the bar 230 disposed on the first and second non-curved portions PP1 and PP2 and the bottom surface of the support plate 300 disposed on the first and second non-curved portions PP1 and PP2. For example, a third gap G3 between the third side 233 (or the fourth side 234) and the fifth side 235 (or the sixth side 236) of the neighboring bars 230 positioned on on the curved portion RP may be less than a fourth gap G4 between the third side 233 (or the fourth side 234) and the fifth side 235 (or the sixth side 236) of the neighboring bars 230 positioned on the first and second non-curved portions PP1 and PP2.

Referring to FIG. 15, a distance between the neighboring bars 230 on the curved portion RP may be substantially equal to or less than a distance between the neighboring bars 230 on the first and second non-curved portions PP1 and PP2 on the side contacting the support plate 300. On the side contacting the support plate 300, a distance DD1 between the first side 231 of the bar 230 and the first side 231 of the neighboring bar 230 on the first and second non-curved portions PP1 and PP2 may be substantially the same or similar to a distance DD2 between the first side 231 of the bar 230 and the first side 231 of the neighboring bar 230 on the curved portion RP.

Figure 16:
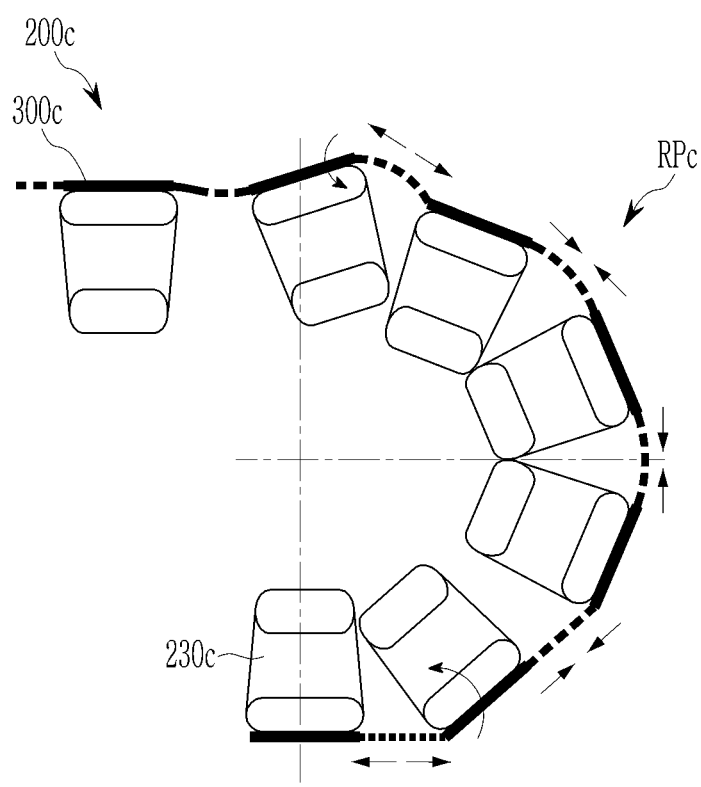
FIG. 16 shows a schematic cross-sectional view of a support structure of a display device according to a comparative example.
Figure 17:
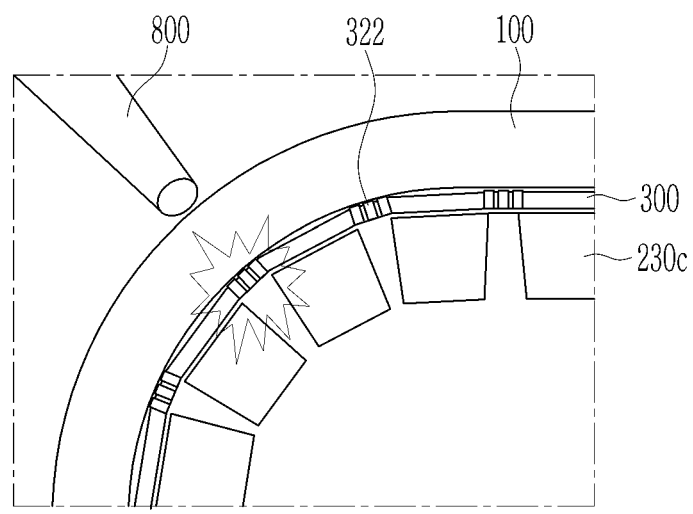
FIG. 17 shows a schematic cross-sectional view on part of a display device according to a comparative example.
Figure 18:
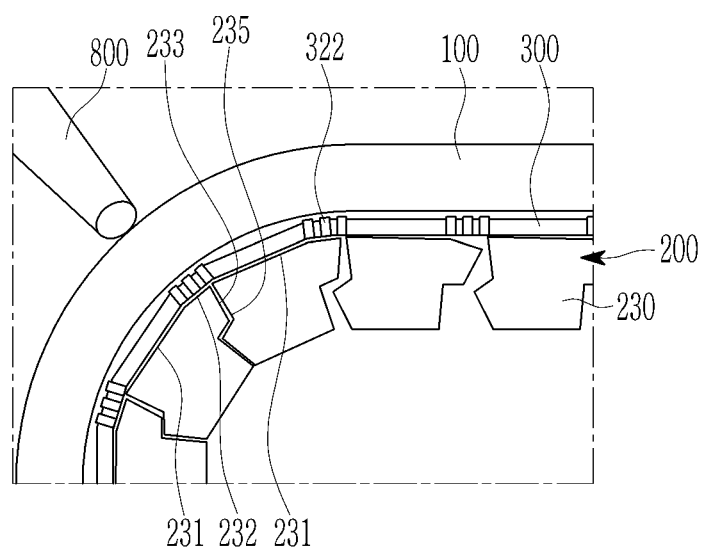
FIG. 18 shows a schematic cross-sectional view of a part of a display device according to an embodiment.

FIG. 16 shows a schematic cross-sectional view of a support structure 200c of a display device 1000 according to a comparative example, FIG. 17 shows a schematic cross-sectional view of a part of a display device 1000 according to a comparative example, and FIG. 18 shows a cross-sectional view of a part of a display device 1000 according to an embodiment.

Referring to FIG. 16, bars 230c included by the support structure 200c of the display device 1000 according to a comparative example do not have the protruding structure of the embodiments so that the spaces between the neighboring bars 230 may not be supported with each other, and the gaps between the neighboring bars 230 may not be maintained. Therefore, in case that the display device 1000 slides, bars 230c positioned on the curved portion RPc may be distorted or the gap between the neighboring bars 230c may not be maintained, and defects may be generated to the support plate 300c and the display panel.

Referring to FIG. 17, in case that a space is generated between bars 230c of the display device 1000 according to a comparative example or in case that there is no structure for supporting the region of the pattern portions 322 of the support plate 300 and an impact is applied to the display device from an external object 800, the display panel 100 and support plate 300 may be transformed or cracked.

Referring to FIG. 18, regarding the display device 1000 according to an embodiment, neighboring bars 230 included by the support structure 200 may be engaged to (or adjacent to) each other to support each other, thereby preventing distortion between the neighboring bars 230. Further, as there is no big space for exposing the pattern portions 322 of the support plate 300 between the neighboring bars 230 on the side contacting the support plate 300 and the second side 232 contacts the support plate 300, in case that impacts are applied to the display device 1000 from the external object 800, the display panel 100 and the support plate 300 may be prevented from being transformed, scratched, or cracked.

Various examples of the support structure 200 of the display device 1000 according to an embodiment will now be described with reference to FIG. 19 to FIG. 24 together with the above-described drawings.

Figure 19:
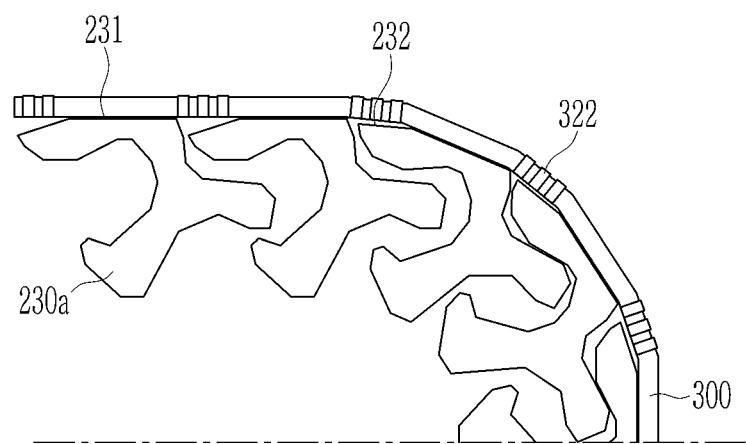
FIG. 19 shows a schematic cross-sectional view of a support structure of a display device according to an embodiment.
Figure 20:
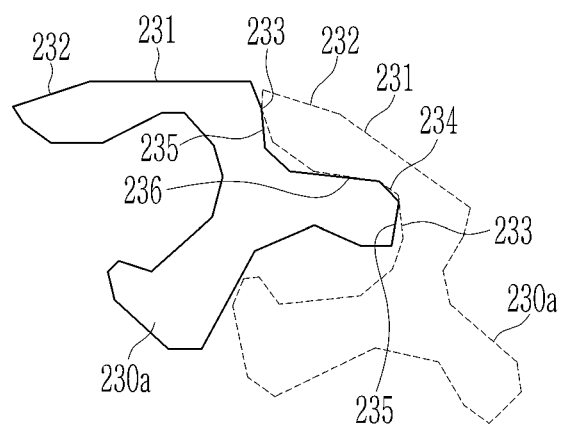
FIG. 20 shows a schematic cross-sectional view of a part of a support structure of a display device according to an embodiment.

FIG. 19 shows a schematic cross-sectional view of a support structure 200 of a display device 1000 according to an embodiment, and FIG. 20 shows a schematic cross-sectional view of a part of a support structure of a display device 1000 according to an embodiment.

Referring to FIG. 19 and FIG. 20, the support structure 200 of the display device 1000 according to an embodiment may include bars 230a. A cross-section shape of the bar 230a may have corners most of which are round, and may have at least three recess portions and at least three protruding structures.

External edge sides of the bar 230a according to an embodiment may include a first side 231, a second side 232 connected to the first side 231 and not in parallel with the first side 231, a third side 233 including two sides forming a step, a fourth side 234 connecting between two sides of the third side 233, a fifth side 235 facing the third side 233 and including two sides forming a step together with the third side 233, and a sixth side 236 connecting between the two sides of the fifth side 235. The first to sixth sides 231 to 236 shown in FIG. 20 may extend in the extending direction of the bar 230a.

The first side 231 may be the side of a surface that faces the above-noted support plate 300 or the display panel 100 and may contact the support plate 300 or the display panel 100. Referring to FIG. 19, the first side 231 may not overlap the support plate 300 and the pattern portions 322.

The second side 232 may be bent from the first side 231 and may be smaller than the first side 231. As shown in FIG. 19, the second side 232 may overlap the region in which the pattern portions 322 of the support plate 300 is positioned.

The third side 233 may be connected to the second side 232 and may be bent from the second side 232. For example, the fifth side 235 may be connected to the first side 231 and may be bent from the first side 231. The third side 233 and the fourth side 234 connected to each other may substantially form a curved alternate shape (e.g., a first curved zigzag shape). The third side 233 and the fourth side 234 connected to each other may be alternately disposed in a curved shape or in a bending shape. For example, the fifth side 235 and the sixth side 236 connected to each other may substantially form a curved alternate shape (e.g., a second curved zigzag shape different from the first curved zigzag shape). The fifth side 235 and the sixth side 236 connected to each other may be alternately disposed in a curved shape or in a bending shape.

Referring to FIG. 19 and FIG. 20, the third side 233 and the fourth side 234 of a bar 230a may be engaged to the fifth side 235 and the sixth side 236 of the neighboring bar 230a to thus support each other and prevent distortion between the neighboring bars 230a. For example, one of the two sides forming the step of the third side 233 of the bar 230a may face one of the two sides forming the step of the fifth side 235 of the neighboring bar 230a. For example, the other one of the two sides forming the step of the third side 233 of the bar 230a may face the other one of the two sides forming the step of the fifth side 235 of the neighboring bar 230a, and the fourth side 234 of the bar 230a may face the sixth side 236 of the neighboring bar 230a.

The bar 230a according to an embodiment may have the characteristics and the effects of the above-described bar 230.

Figure 21:
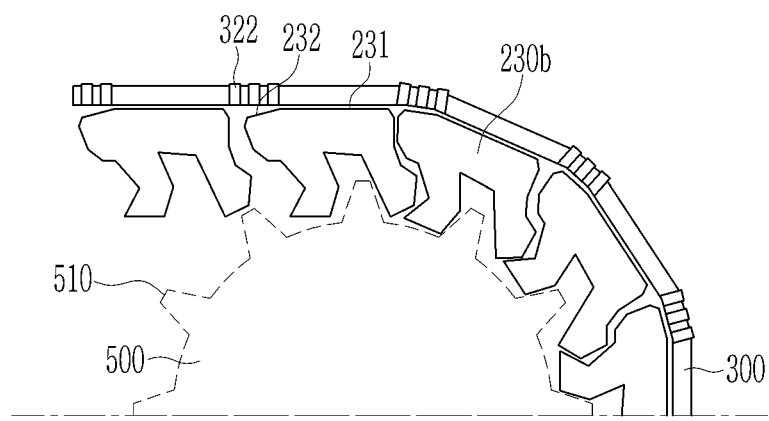
FIG. 21 shows a schematic cross-sectional view of a support structure of a display device according to an embodiment.
Figure 22:
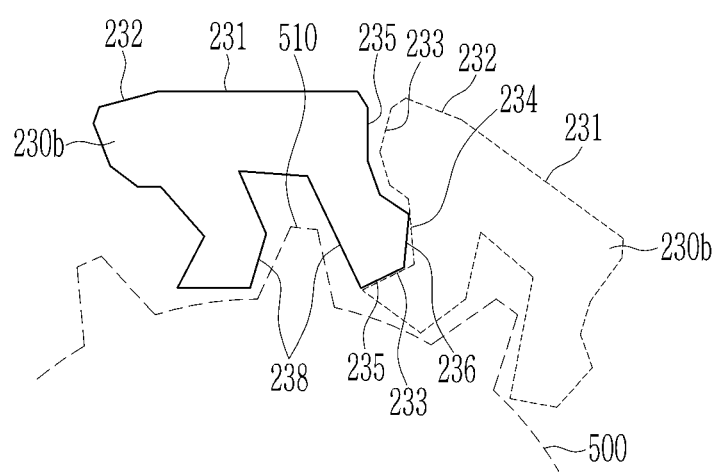
FIG. 22 shows a schematic cross-sectional view of a part of a support structure of a display device according to an embodiment.

FIG. 21 shows a schematic cross-sectional view of a support structure 200 of a display device 1000 according to an embodiment, and FIG. 22 shows a schematic cross-sectional view of a part of a support structure 200 of a display device 1000 according to an embodiment.

Referring to FIG. 21 and FIG. 22, the support structure 200 of the display device 1000 according to an embodiment may include bars 230b. A cross-sectional shape of the bar 230b may have at least one recess portion and at least two protruding structures.

An external edge side of the bar 230b according to an embodiment may include a first side 231, a second side 232, which is connected to the first side 231 and is not in parallel with the first side 231, a third side 233 including two sides forming a step, a fourth side 234 connecting between the two sides of the third side 233, a fifth side 235 including two sides facing the third side 233 and forming a step in a like way of the third side 233, and a sixth side 236 connecting between the two sides of the fifth side 235. The first to sixth sides 231 to 236 shown in FIG. 22 may extend in the extending direction of the bar 230b.

The first side 231 may be the side of a surface that faces the above-noted support plate 300 or the display panel 100 and may contact the support plate 300 or the display panel 100. Referring to FIG. 21, the first side 231 may not overlap the pattern portions 322 of the support plate 300.

The second side 232 may be bent from the first side 231 and may be smaller than the first side 231. As shown in FIG. 21, the second side 232 may overlap the region in which the pattern portions 322 of the support plate 300 is positioned.

The third side 233 may be connected to the second side 232 and may be bent from the second side 232. For example, the fifth side 235 may be connected to the first side 231 and may be bent from the first side 231. The third side 233 and the fourth side 234 connected to each other may form a curved alternate shape (e.g., a first curved zigzag shape), and the fifth side 235 and the sixth side 236 connected to each other may form a curved alternate shape (e.g., a second curved zigzag shape different from the first curved zigzag shape).

Referring to FIG. 21 and FIG. 22, the third side 233 and the fourth side 234 of a bar 230b may be engaged to the fifth side 235 and the sixth side 236 of the neighboring bar 230b to thus support each other and prevent distortion between the neighboring bars 230b. For example, one of the two sides forming the step of the third side 233 of the bar 230b may face one of the two sides forming the step of the fifth side 235 of the neighboring bar 230b. For example, the other one of the two sides forming the step of the third side 233 of the bar 230b may face the other one of the two sides forming the step of the fifth side 235 of the neighboring bar 230b. For example, the fourth side 234 of the bar 230b may face the sixth side 236 of the neighboring bar 230b.

The bar 230b may include a recess portion 238. The display device 1000 according to an embodiment may further include a gear structure (e.g., a gear member) 500 including protrusions 510 engaged to the recess portion 238 of bars 230b. The gear structure 500 may further include a power device such as a motor or may be connected thereto. The gear structure 500 may rotate in case that the display device 1000 performs a slide-in or slide-out operation, to thus ease the movement of bars 230b and support the slide-in or slide-out operation of the display device 1000.

The bar 230b according to an embodiment may have the characteristics and the effects of the above-described bar 230.

Figure 23:
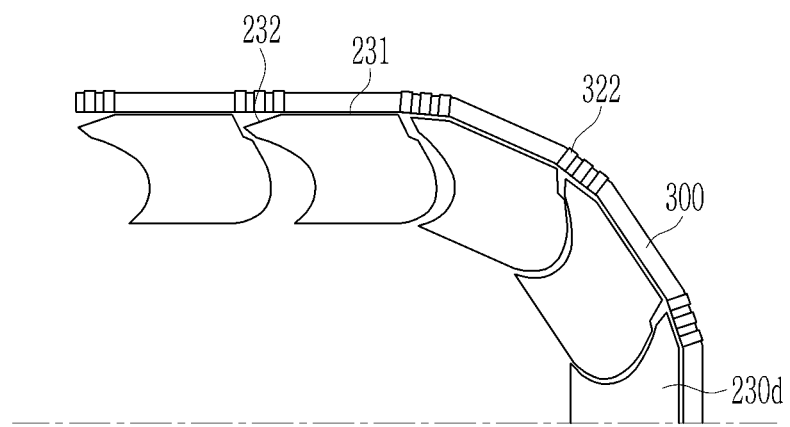
FIG. 23 shows a schematic cross-sectional view of a support structure of a display device according to an embodiment.
Figure 24:
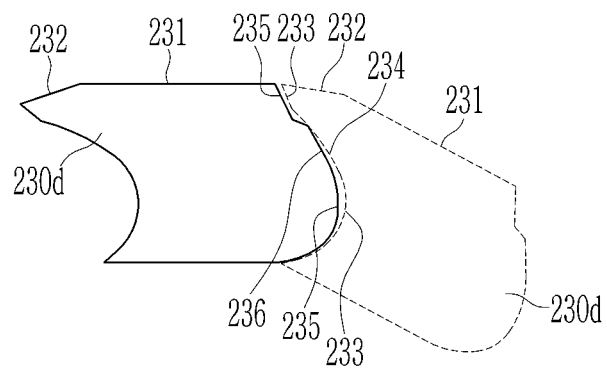
FIG. 24 shows a schematic cross-sectional view of a part of a support structure of a display device according to an embodiment.

FIG. 23 shows a schematic cross-sectional view of a support structure 200 of a display device 1000 according to an embodiment, and FIG. 24 shows a schematic cross-sectional view of a part of a support structure 200 of a display device 1000 according to an embodiment.

Referring to FIG. 23 and FIG. 24, the support structure 200 of the display device 1000 according to an embodiment may include bars 230d. A cross-sectional shape of the bar 230d may include at least one recess portion and a protruding structure.

An external edge side of the bar 230d according to an embodiment may include a first side 231, a second side 232, which is connected to the first side 231 and is not in parallel with the first side 231, a third side 233 including two sides forming a step, a fourth side 234 connecting between the two sides of the third side 233, a fifth side 235 including two sides facing the third side 233 and forming a step in a like way of the third side 233, and a sixth side 236 connecting between the two sides of the fifth side 235. The first to sixth sides 231 to 236 shown in FIG. 24 may extend in the extending direction of the bar 230d.

The first side 231 may be the side of a surface that faces the above-noted support plate 300 or the display panel 100 and may contact the support plate 300 or the display panel 100. Referring to FIG. 23, the first side 231 may not overlap the pattern portions 322 of the support plate 300.

The second side 232 may be bent from the first side 231 and may be smaller than the first side 231. The second side 232 may overlap the region in which the pattern portions 322 of the support plate 300 is positioned, as shown in FIG. 23.

The third side 233 may be connected to the second side 232 and may be bent from the second side 232. For example, the fifth side 235 may be connected to the first side 231 and may be bent from the first side 231. The third side 233 and the fourth side 234 may form a concave shape, and the fifth side 235 and the sixth side 236 may form a convex shape.

Referring to FIG. 23 and FIG. 24, the third side 233 and the fourth side 234 of a bar 230d may be engaged to the fifth side 235 and the sixth side 236 of the neighboring bar 230d to thus support each other and prevent distortion between the neighboring bars 230d. For example, one of the two sides forming the step of the third side 233 of the bar 230d may face one of the two sides forming the step of the fifth side 235 of the neighboring bar 230d. For example, the other one of the two sides forming the step of the third side 233 of the bar 230d may face the other one of the two sides forming the step of the fifth side 235 of the neighboring bar 230d. For example, the fourth side 234 of the bar 230d may face the sixth side 236 of the neighboring bar 230d.

The bar 230d according to an embodiment may have the characteristics and the effects of the above-described bar 230.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A slidable display device comprising:
a display panel; and
a support member supporting the display panel, wherein the support member includes:
a first portion maintaining a form, and
a second portion adjacent to the first portion and transformable,
the second portion of the support member includes a plurality of bars, and
each of the plurality of bars includes an edge side including:
a first side;
a second side connected to the first side and being inclined from the first side;
a third side including two sides forming a step;
a fourth side connecting between the two sides of the third side;
a fifth side including two sides facing the third side and forming a step; and
a sixth side connecting between the two sides of the fifth side.

2. The slidable display device of claim 1, wherein the first side of each bar faces the display panel.

3. The slidable display device of claim 2, wherein
the plurality of bars include a first bar and a second bar that are adjacent to each other and engaged to each other, and
the third side and the fourth side of the first bar face the fifth side and the sixth side of the second bar.

4. The slidable display device of claim 3, wherein
the third side and the fourth side are alternately disposed in a linear shape or a curved shape, and
the fifth side and the sixth side are alternately disposed in a linear shape or a curved shape.

5. The slidable display device of claim 3, wherein
the third side and the fourth side form a concave shape, and
the fifth side and the sixth side form a convex shape.

6. The slidable display device of claim 1, wherein the slidable display device includes:

a curved portion of which a position is changeable according to a sliding operation, and a first non-curved portion connected to the curved portion, and the first non-curved portion includes the first portion of the support member.

7. The slidable display device of claim 6, wherein the curved portion includes the second portion of the support member.

8. The slidable display device of claim 7, wherein, in case that a slide-out operation is performed, a position of the curved portion is moved and the first non-curved portion extends.

9. The slidable display device of claim 8, further comprising:

a second non-curved portion connected to the curved portion in case that a slide-in operation is performed, wherein the second non-curved portion faces the first non-curved portion, and the second non-curved portion includes the first portion of the support member.

10. The slidable display device of claim 6, wherein a gap between neighboring bars disposed on the curved portion is less than a gap between neighboring bars disposed on the first non-curved portion.

11. The slidable display device of claim 6, wherein the plurality of bars include:

a first bar and a second bar adjacent to each other and disposed on the curved portion and a third bar and a fourth bar adjacent to each other and disposed the first non-curved portion, and a distance between the first side of the first bar and the first side of the second bar is substantially equal to a distance between the first side of the third bar and the first side of the fourth bar.

12. The slidable display device of claim 1, further comprising a support plate disposed between the display panel and the support member, wherein the support plate includes a planar plate portion overlapping the first portion of the support member and a flexible portion overlapping the second portion of the support member.

13. The slidable display device of claim 12, wherein the flexible portion of the support plate includes a plurality of pattern portions from which at least part of the support plate is removed.

14. The slidable display device of claim 13, wherein the first side does not overlap the plurality of pattern portions, and the second side overlaps the plurality of pattern portions.

15. The slidable display device of claim 1, further comprising:

a pair of guide portions disposed on a lateral side on which respective end portions of the bars are disposed, wherein the guide portion includes a guide rail that guides movement of the bars.

16. The slidable display device of claim 15, wherein the plurality of bars further include a combining portion disposed on respective end portions, and the combining portion includes a first fixing portion and a second fixing portion disposed on respective sides of the guide rail.

17. A slidable display device comprising:

a display panel; and a support member supporting the display panel, wherein the support member includes:

a first portion maintaining a form, and a second portion adjacent to the first portion and transformable, the second portion includes a plurality of bars, the display panel and the support member include a curved portion of which a position is changeable according to a sliding operation and a first non-curved portion connected to the curved portion, the first non-curved portion includes the first portion of the support member, and a gap between neighboring bars of the plurality of bars disposed on the curved portion is less than a gap between neighboring bars of the plurality of bars disposed on the first non-curved portion.

18. The slidable display device of claim 17, wherein the curved portion includes the second portion of the support member, and the position of the curved portion is moved and the first non-curved portion extends in case that a slide-out operation is performed.

19. The slidable display device of claim 17, wherein each of the plurality of bars respectively includes a first side facing the display panel, the plurality of bars include:

a first bar and a second bar adjacent to each other and disposed on the curved portion, and a third bar and a fourth bar adjacent to each other and disposed the first non-curved portion, and a distance between the first side of the first bar and the first side of the second bar is substantially equal to a distance between the first side of the third bar and the first side of the fourth bar.

20. A slidable display device comprising:

a display panel;

a support member supporting the display panel; and a support plate disposed between the display panel and the support member, wherein the support member includes:

a first portion maintaining a shape, and a second portion disposed near the first portion and being transformable, the second portion includes a plurality of bars, the display panel and the support member include a curved portion of which a position is changeable according to a sliding operation, and a first non-curved portion connected to the curved portion, each of the plurality of bars includes an edge side including:

a first side contacting a support plate, and a second side bent on the first side, wherein the second side of the bar disposed on the first non-curved portion is spaced from the support plate by a first gap, and the second side of the bar disposed on the curved portion is spaced from the support plate by a second gap that is less than the first gap or contacts the support plate.

* * * * *